(No Model.) 2 Sheets—Sheet 1.
A. D. BLODGETT.
VEHICLE RUNNING GEAR.
No. 574,704. Patented Jan. 5, 1897.
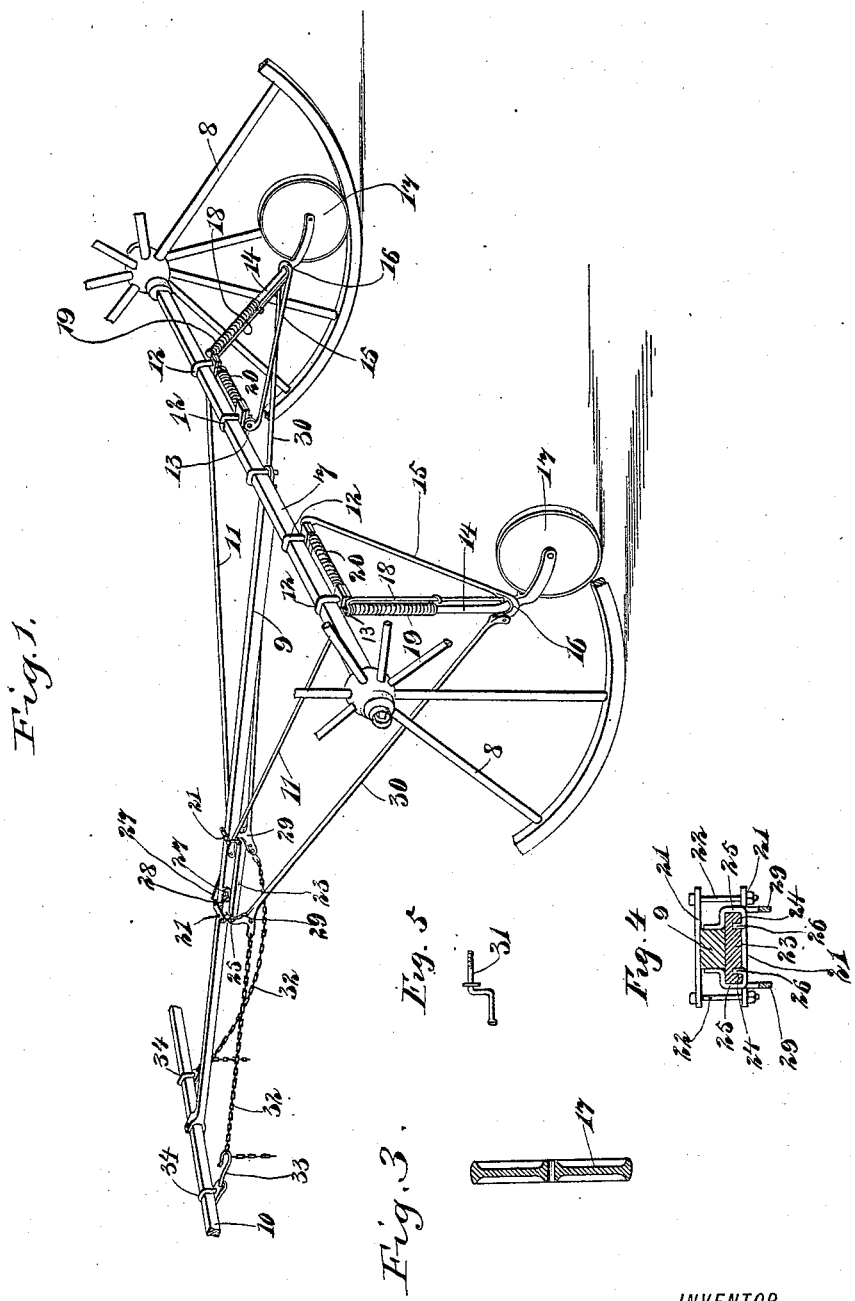
WITNESSES:
INVENTOR
A. D. Blodgett,
BY
ATTORNEYS.

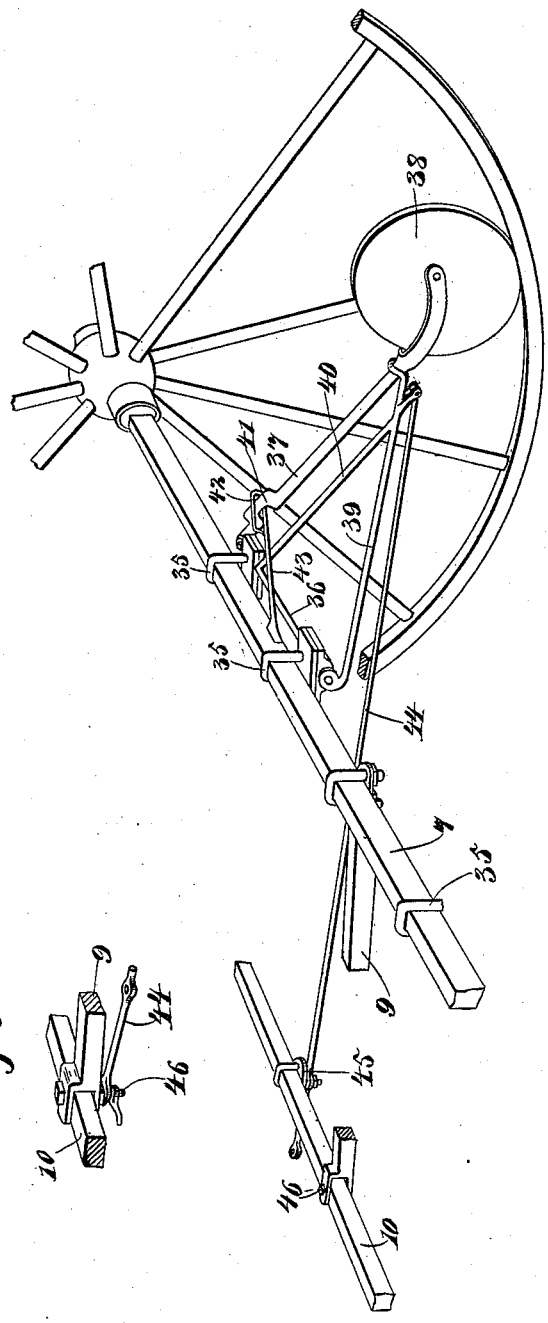

UNITED STATES PATENT OFFICE.

ARCHIE DEMEL BLODGETT, OF BERLIN, NEW HAMPSHIRE.

VEHICLE RUNNING-GEAR.

SPECIFICATION forming part of Letters Patent No. 574,704, dated January 5, 1897.

Application filed May 22, 1896. Serial No. 592,526. (No model.)

*To all whom it may concern:*

Be it known that I, ARCHIE DEMEL BLODGETT, of Berlin, in the county of Coos and State of New Hampshire, have invented a new and Improved Vehicle Running-Gear, of which the following is a full, clear, and exact description.

The object of this invention is to provide superior means for permitting the turning of vehicles in a short space; and the invention relates to that class of running-gear in which two small wheels or casters are mounted beneath an axle of the vehicle and provided with mechanism by which they may be made to engage the ground and lift the main wheels off the same, so that the distance between the wheels which then support the axle will be diminished, permitting a short turn.

The invention will be fully described hereinafter and defined in the claims.

Reference is to be had to the accompanying drawings, forming a part of this specification, in which similar characters of reference indicate corresponding parts in all the figures.

Figure 1 is a fragmentary perspective view of the running-gear applied. Fig. 2 is a similar view showing a modification. Fig. 3 is a detail sectional view of one of the casters. Fig. 4 is a detail sectional view showing the guideway and slides for the caster-actuating rods. Fig. 5 is a detail view showing the bolt for holding together the slides of the two casters, and Fig. 6 is a view showing the form of my invention illustrated in Fig. 2 with a change of adjustment.

Referring to Figs. 1, 3, 4, and 5, the rear axle 7 is mounted, as usual, on wheels 8, and the reach 9 is rigidly connected to the rear axle and extends forwardly to the front axle 10, to which the reach is pivotally connected, the usual braces 11 being attached to the reach and extending rearwardly and outwardly to the rear axle, to which the braces are also attached.

Clamped to the rear axle 7, and two on each side of the center thereof, are the clips 12, each of which comprises two bearing-plates. Between the bearing-plates of each pair of clips a shaft 13 is revolubly mounted, to the outer end of each of which shafts a vertical shaft 14 is revolubly connected, while the inner end of each shaft 13 is rigidly attached to a downwardly and outwardly extending brace 15, the braces 15 being provided at their lower ends with bearings 16, in which the lower portions of the respective shafts 14 are revolubly mounted. Each shaft 14 has its lower end bent rearwardly and bifurcated to receive a caster 17, the detail form of which is shown in Fig. 3.

Rigidly connected with the outer end of each shaft 13 and with the respective bearings 16 is a rod 18, to which rods the lower terminals of the torsional springs 19 are respectively connected, the upper terminals of such springs being respectively connected to the shafts 14, and the springs receive the shafts 14, as the drawings show. The springs are adjusted so as to keep the casters 17, with their axes, transverse to the reach 9, it being understood that the springs permit a change of this adjustment during the turning of the vehicle. Receiving each shaft 13 is a torsional spring 20, each of which is connected to its respective shaft 13 and to one of the clips 12, the tendency of the springs 20 being to throw the shafts 14 rearward and upward to the position shown at the right in Fig. 1.

Rigidly held at the under side of the reach 9 and at approximately the middle thereof, by means of clip-plates 21 and bolts 22, is a track-plate 23, the under side of which is provided adjacent to each edge with a groove 24. Embracing each edge of the plate 23 is a slide 25, and the lower portion of each slide has an upwardly-extending projection 26, respectively sliding within the grooves 24. Each slide 25 coöperates with an arm 27, carried by a thumb-screw 28, in turn held to the sides of the reach 9. These arms are capable of swinging to allow the slides 25 to move freely or to engage their slides and hold them at the limit of their forward movement. The left-hand arm 27 in Fig. 1 is shown engaged with the appropriate slide, while the right-hand arm 27 is shown to be lifted to allow free movement of the corresponding slide.

Projecting downwardly from each slide 25 is an arm 29, which arms are rigidly connected to or formed integral with the rods 30, extending downwardly and rearwardly to the bearings 16 and pivotally connected thereto. Formed in each of the arms 29 is an internally-threaded opening through which the locking-bolt 31 (see Fig. 5) is adapted to pass, and by which the two slides 25 may be connected to move in unison with each other. Each arm 29 is provided with a chain 32, the chains extending forwardly and being connected to each side of the front axle 10 by means of hooks 33, held on the axle by clips 34.

The normal position of the shafts 14 being that of the right-hand shaft shown in Fig. 1, it will be seen that as the axle 10 turns, say to the right, as the figure shows, the left-hand chain 32 will be drawn on to swing the corresponding shaft 14 downward and engage its caster with the ground, so as to lift the left-hand wheel 8 from engagement with the ground. It will be seen that the vehicle may now turn in a very much decreased space. This movement of the shaft 14 is attained by the movement of the left-hand slide 25 on the guide-plate 23. It may be necessary in some cases to engage both of the casters 17 with the ground, and this is attained by connecting the slides 25 with each other through the medium of the bolt 31, whereupon as the axle 10 moves to either side both casters will be engaged with the ground, since the two slides must move in unison with each other. Should it be desirable for either or both of the castors 17 to continuously engage the ground and to take the place of the respective wheels, (supposing, for example, that the wheels were broken,) one of the thumb-screws 28 should be tightened against the reach 19 to hold the appropriate plate 27 engaged with the corresponding slide 25, thus making the movement of this slide impossible, and after the corresponding caster has been adjusted to engage the ground it will be seen that the restrained slide will prevent the return of the caster.

The form of the running-gear shown in Figs. 2 and 6 is such as avoids the connection of the rods 30 with the reach and also the employment of the springs 19 and 20, as in the other form shown. I attain this end by four clips 35, fixed two to each side of the center of the rear axle 7, (only two of the clips are fully shown in the drawings,) and these clips 35 have two transverse shafts 36 revolubly mounted therein. In the drawings only one shaft is shown. To the outer end of each shaft 36 a shaft 37 is revolubly connected. The shafts 37 have their lower ends bent rearwardly and provided with casters 38.

The inner end of each shaft 36 has fixedly connected thereto a rod 39, the lower ends of which are respectively connected to the lower portions of the shafts 37, and the rods 39 are braced against the respective shafts 36 by means of rods 40. Formed on the upper portion of each shaft 37 is a double crank 41, respectively received by loops 42, formed at the free ends of spring-arms 43, the arms 43 being carried by the rear axle 7 and only one being illustrated in the drawings.

Connected to the lower end of each rod 40 is a rod 44, the rods 44 respectively extending forward to the axle 10 and being pivotally connected thereto by means of clips 45. The spring-arms 43, coöperating with the cranks 42 at each side of the axle 7, hold the axes of the casters 38 transverse to the reach 9 and at the same time permit the casters to turn as their operation may make necessary, while the attachment of the rods 44 direct to the axle 10 makes it unnecessary to provide the guide-plate and slide devices of the other form. This species of my invention is especially adapted to vehicles in which it is inconvenient or undesirable to attach the rods 44 to the reach.

Should it be desired to hold either or both of the casters 38 in engagement with the ground for the purposes explained in connection with Figs. 1, 3, 4, and 5, the rods 44 may be disconnected from the clips 45 and attached to the bolt 46, which bolt connects the front axle 10 and the reach 9 This adjustment is shown in Fig. 6, and by means of such adjustment the casters 38 may be held engaged with the ground irrespective of the operation of the front axle 10. To permit this adjustment, the rods 44 are each provided with two openings in their forward ends, as may be seen in the drawings, the front openings being adapted for connection with the bolt 46, while the rear openings are adapted for connection with clips 45.

While I have shown and described as above the details of my invention, it will be understood that I am not limited to these specific devices, but that my invention is susceptible of the many variations in form and embodiment without departing from the spirit thereof. Hence I consider myself entitled to all such changes.

Having thus described my invention, I claim as new and desire to secure by Letters Patent—

1. The combination with the axle of a vehicle, of a transverse shaft rockably mounted on the axle, a second shaft revolubly connected with the rock-shaft and extending at right angles thereto, means for normally holding the second shaft upward, a caster carried by the second shaft, and a draft-rod connected with the second shaft and capable of drawing the same downward to engage the caster with the ground, substantially as described.

2. The combination with the front and rear axles of a vehicle, of a rock-shaft held by the rear axle, a second shaft revolubly connected with the rock-shaft, means for normally holding the second shaft upward, a caster carried by the second shaft, and a connection between the second shaft and the front axle, by which the second shaft may be lowered to engage the caster with the ground, substantially as described.

3. The combination with a vehicle having a front and rear axle, of a shaft pivotally connected with the rear axle, a caster carried by the shaft, a spring normally lifting the shaft, and a connection between the shaft and the front axle, substantially as described.

4. The combination with a vehicle having a front and rear axle and a reach connecting the axles, of a rock-shaft held by the rear axle, a second shaft pivotally connected to the rock-shaft and extending outwardly therefrom, means for normally raising the second shaft, a caster carried by the second shaft, a slide held on the reach, a rod connecting the second shaft and slide, and a connection between the slide and front axle, substantially as described.

5. The combination with a vehicle having a front and rear axle and a reach connecting the axles, of a shaft pivotally carried by the rear axle, a caster held by the shaft, means for normally lifting the shaft, a slide longitudinally movable on the reach, a rod connecting the shaft and the slide, and a connection between the slide and the front axle, substantially as described.

6. The combination with a vehicle having a front and rear axle and a reach connecting the axles, of a shaft pivotally carried by the rear axle, means for normally lifting the shaft, a caster carried by the shaft, a rod connected to the shaft, a guide-plate held beneath the reach, a slide movable on the guide-plate and connected to the rod, and a connection between the slide and the front axle, substantially as described.

7. The combination with a vehicle having a front and rear axle and a reach connecting the axles, of a guide-plate held beneath the reach, a slide movable on each edge of the guide-plate, a rod connected to each slide, a connection between each slide and the front axle, two shafts pivotally carried by the rear axle and respectively connected to the rods, means for normally lifting the shafts, and a caster carried by each shaft, substantially as described.

8. The combination with a support, of a shaft connected thereto and capable of having swinging and axial movement, the shaft having a crank, and a spring-arm formed with a loop receiving the crank, substantially as described.

9. The combination with a support, of a shaft having axial movement thereon, the shaft being formed with a crank, and a spring-arm having a loop receiving the crank, substantially as described.

10. The combination with an axle, of a rock-shaft carried by the axle, a second shaft revolubly connected with the rock-shaft and formed with a crank, and an arm carried by the axle and provided with a loop receiving the crank of the second shaft, substantially as described.

11. The combination of a rock-shaft, bearings for the rock-shaft, a second shaft having revoluble connection with the rock-shaft, a caster carried by the second shaft, means for raising the second shaft, and a rod connected to the second shaft and capable of drawing the same downward, substantially as described.

ARCHIE DEMEL BLODGETT.

Witnesses:
R. N. CHAMBERLIN,
G. P. BICKFORD.